(12) United States Patent
Kawasaki (10) Patent No.: US 9,014,735 B2
(45) Date of Patent: Apr. 21, 2015

(54) BASE STATION AND INTERFERENCE REDUCTION METHOD IN BASE STATION

(75) Inventor: Yoshihiro Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 2069 days.

(21) Appl. No.: 11/889,263

(22) Filed: Aug. 10, 2007

(65) Prior Publication Data
US 2007/0280170 A1    Dec. 6, 2007

Related U.S. Application Data

(63) Continuation of application No. PCT/JP2005/002556, filed on Feb. 18, 2005.

(51) Int. Cl.
| | | |
|---|---|---|
| H04B 15/00 | (2006.01) | |
| H04W 72/12 | (2009.01) | |
| H04W 52/24 | (2009.01) | |
| H04W 92/20 | (2009.01) | |

(52) U.S. Cl.
CPC ........ *H04W 72/1231* (2013.01); *H04W 52/243* (2013.01); *H04W 52/247* (2013.01); *H04W 72/1278* (2013.01); *H04W 72/1289* (2013.01); *H04W 92/20* (2013.01)

(58) Field of Classification Search
USPC ................. 455/501, 522, 525, 560, 428, 445, 455/67.11, 423; 370/342, 252, 335, 330, 370/468
See application file for complete search history.

(56) References Cited

U.S. PATENT DOCUMENTS

| | | | | |
|---|---|---|---|---|
| 6,044,067 A * | 3/2000 | Suzuki | ........................... | 370/252 |
| 6,519,457 B1 * | 2/2003 | Jiang et al. | .................... | 455/442 |
| 2002/0118665 A1 * | 8/2002 | Cleveland et al. | ............ | 370/342 |
| 2003/0073409 A1 * | 4/2003 | Nobukiyo et al. | ........... | 455/67.1 |
| 2004/0062218 A1 | 4/2004 | Ue | | |
| 2004/0127191 A1 * | 7/2004 | Matsunaga | .................... | 455/403 |
| 2004/0166899 A1 | 8/2004 | Nakayasu | | |

(Continued)

FOREIGN PATENT DOCUMENTS

| | | |
|---|---|---|
| JP | 10-065604 | 3/1998 |
| JP | 10-112681 | 4/1998 |

(Continued)

OTHER PUBLICATIONS

Japanese Patent Office "Notification of Reason for Refusal" for corresponding Japanese Patent Application No. 2007-503536, dispatched Jan. 19, 2010. English translation attached.

(Continued)

*Primary Examiner* — Golam Sorowar
(74) *Attorney, Agent, or Firm* — Myers Wolin, LLC (57) ABSTRACT

A base station communicates with mobile terminals existing within a subordinate cell, and in addition executes control to reduce interference from mobile terminals existing within adjacent cells. The base station measures the total interference power received from mobile terminals in all adjacent cells, and if the total interference power is greater than a preset value, issues a request to the base stations of all adjacent cells to reduce interference. The base station which has received the interference reduction request discriminates mobile terminals which impart interference to the base station which is the source of the interference reduction request, and reduces interference by either temporarily lowering the uplink data transmission rate or temporarily halting uplink data transmission for such mobile terminals.

12 Claims, 11 Drawing Sheets

(56) References Cited

U.S. PATENT DOCUMENTS

| | | | |
|---|---|---|---|
| 2004/0166900 A1* | 8/2004 | Qiu et al. | 455/560 |
| 2005/0239489 A1* | 10/2005 | Qian et al. | 455/522 |

FOREIGN PATENT DOCUMENTS

| | | |
|---|---|---|
| JP | 2000-316183 | 11/2000 |
| JP | 2001-339342 | 12/2001 |
| JP | 2003-199173 | 7/2003 |
| JP | 2003219459 | 7/2003 |
| JP | 2003-259414 | 9/2003 |
| JP | 2004-207839 | 7/2004 |
| JP | 2004-253932 | 9/2004 |
| WO | 2004/056008 | 7/2004 |

OTHER PUBLICATIONS

Extended European Search Report with written opinion for corresponding European Patent Application No. 10161431.1 dated Jul. 22, 2010.

Qualcomm; "Overload Indicator Command Triggering"; Agenda Item: 11.2; Document for: Discussion; 3GPP TSG-RAN WG2 meeting #46; Feb. 14-18, 2005, Scottsdale, USA.

3GPP TS 25.309 V6.1.0 (Dec. 2004); 3rd Generation Partnership Project; Technical Specification Group Radio Access Network; FDD Enhanced Uplink; Overall description; Stage 2; (Release 6); dated Dec. 2004.

The State Intellectual Property Office of China "First Notification of Office Action" and text of Office Action, issued for corresponding Chinese Patent Application No. 201010162629.8, issued Feb. 16, 2011. English translation attached.

Japanese Patent Office "Notification of Reason for Refusal" issued for corresponding Japanese Patent Application No. 2010-065520, dispatched Nov. 8, 2011. English translation attached.

Extended European search report including the European search report or the partial European search report/declaration of no search and the European search opinion issued for corresponding European Patent Application No. 12188035.5, dated Dec. 5, 2012.

Decision of Refusal office action issued for corresponding Japanese Patent Application No. 2010-065520 dispatched Apr. 3, 2012 with English translation.

* cited by examiner

→ CONNECTED
---→ INTERFERENCE

FIG. 16 PRIOR ART

BASE STATION AND INTERFERENCE REDUCTION METHOD IN BASE STATION

BACKGROUND OF THE INVENTION

This invention relates to a base station and to an interference reduction method in the base station, and in particular relates to a base station and an interference reduction method in the base station in which communication is performed with mobile terminals existing in a subordinate cell, and control is performed to reduce interference from mobile terminals existing in adjacent cells.

With rapid advances in practical use of CDMA (Code Division Multiple Access) communication systems, commercial services of wideband CDMA (W-CDMA) have been begun to enable exchange of large amounts of data, including video as well as audio and still images. Specifications for wideband CDMA systems have been established by the 3rd Generation Partnership Project (3GPP), an organization for standardization of third-generation mobile communication systems, and various specifications continue to be studied and appended, with the goal of obtaining systems capable of higher-quality services than are presently possible.

Figure 14:
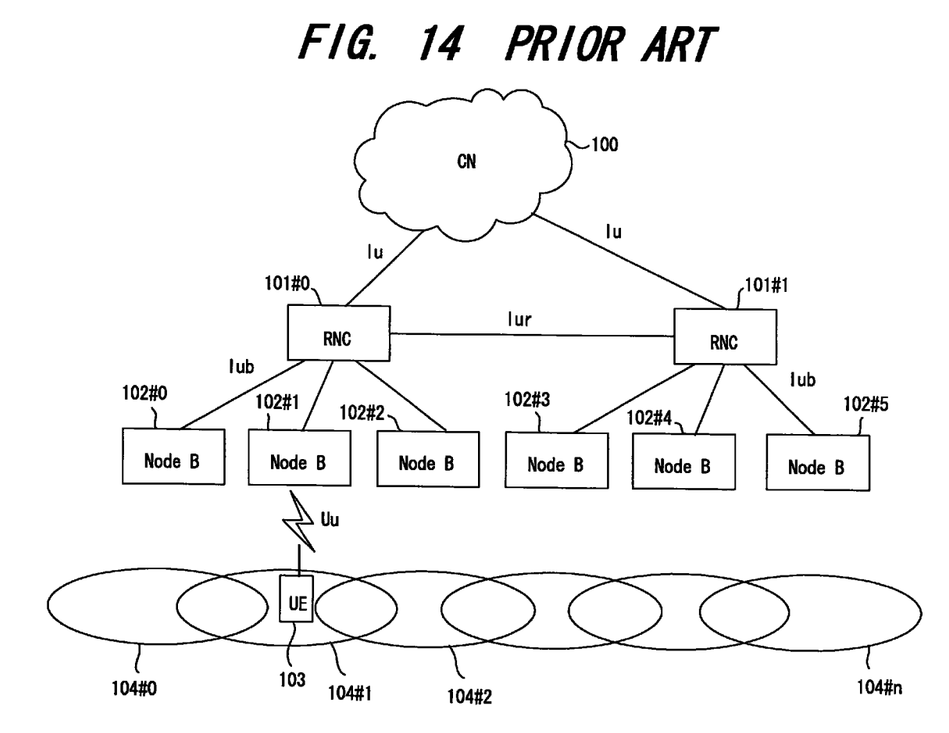
FIG. 14 shows the network configuration of a W-CDMA system conforming to current 3GPP specifications.

FIG. 14 is a diagram of the network of a W-CDMA system under current 3GPP specifications. The system comprises four types of nodes, which are a higher-level, network (CN: Core Network) 100, radio network controllers (RNCs) 101#0 to 101#n, radio base stations (NodeB) 102#0 to 102#n, and mobile terminals (UE: User Equipment) 103. Each of the nodes 100, 101#0 to 101#n, 102#0 to 102#n are physically connected by ATM (Asynchronous Transfer Mode) transmission paths or similar (wire intervals). The radio base stations 102#0 to 102#n and the mobile terminals 103 are connected by radio signals (radio intervals). Iu is an interface between the radio network controllers 101#0 to 101#n and the core network 100; Iur is an interface between the radio network controllers 101#0 to 101#n; Iub is an interface between the radio network controllers 101#0 to 101#n and the radio base stations 102#0 to 102#n; and Uu is an interface between the radio base stations 102#0 to 102#n and the mobile terminals 103.

User data is transmitted from CN 100, which contains exchanges, servers, databases and similar, to the RNCs 101#0 and 101#1, via Iu circuits. When a destination mobile terminal UE 103 exists within a subordinate cell 104#1 of RNC 101#0, user data is transmitted from RNC 101#0 via an Iub circuit to NodeB 102#1 accommodating the cell, and is transmitted via the Uu interface to the mobile terminal UE 103.

Figure 15:
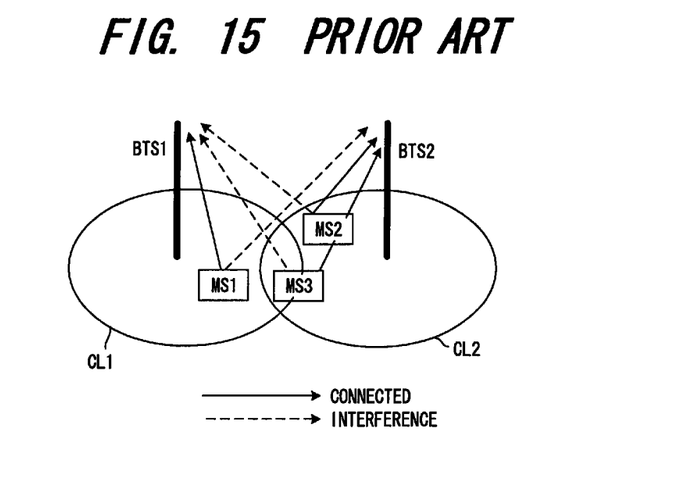
FIG. 15 is a conceptual diagram in which, among two cells, mobile terminals in one cell are imparting interference to a base station in the adjacent cell.

In a mobile CDMA system comprising a plurality of cells as described above, signals transmitted by a mobile terminal to a connected base station (uplink signals or reverse-like signals) arrive at the base stations of adjacent cells also, and when the same frequency band is being used in uplinks between cells, such signals become interference signals for adjacent cells as a result. In particular, when a mobile terminal exists in a border region in which a plurality of cells overlap, the level of interference signals for adjacent cells due to transmission signals from the mobile terminal increases. FIG. 15 shows conceptually the interference transmitted to the base station of an adjacent cell by a mobile terminal within one of two cells. To facilitate the explanation, it is assumed that the number of base stations (cells) is two, and that the number of mobile terminals is three.

A mobile terminal MS1 within a cell CL1 is in communication with base station BTS1, but transmission signals from the mobile terminal MS1 also arrive at the base station BTS2 of an adjacent cell CL2 to become interference signals. Moreover, mobile terminals MS2, MS3 in cell CL2 are in communication with base station BTS2, but transmission signals from these mobile terminals MS2, MS3 arrive at the base station BTS1 of adjacent cell CL1 to become interference signals. In this case, the interference of mobile terminal MS3 existing in the border region at which cells CL1 and CL2 overlap is greater than the interference from mobile terminal MS2, which does not exist in the border region.

Figure 16:
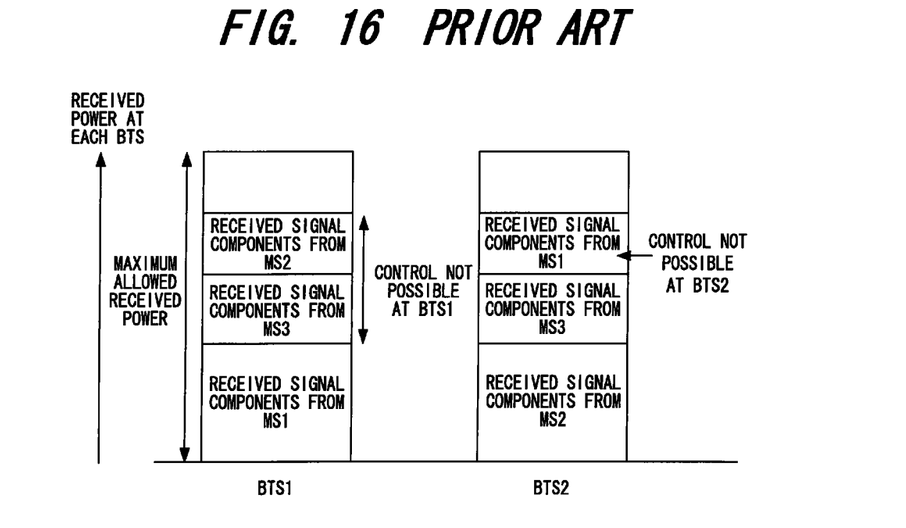
FIG. 16 explains the limiting of radio resources by interference from adjacent cells.

FIG. 16 is a conceptual diagram of received signal components at base stations BTS1, BTS2 of cells CL1, CL2 shown in FIG. 15. As shown in FIG. 16, the received signal power at BTS1 is the sum of the received signal power from mobile terminal MS1 in subordinate cell CL1, and the received signal power from mobile terminals MS2, MS3 within an adjacent cell (cell CL2). Strictly speaking, this power also includes thermal noise, but this is omitted. The received signal power in base station BTS2 is the sum of the received signal power of mobile terminals MS2, MS3 in subordinate cell CL2, and the received signal power from mobile terminal MS1 in an adjacent cell (cell CL1).

The maximum allowed received signal power in a base station is regarded as a radio uplink resource; this radio resource is limited by interference signals from adjacent cells. On the other hand, a mobile terminal in a cell governed by a base station which is receiving interference from an adjacent cell also provides interference to the adjacent cell, and limits the radio resources of the adjacent cell.

In a current 3GPP W-CDMA system, a radio network controller RNC controls the resource of a base station BTS performs call acceptance control (admission control, congestion control) based on the total received signal power of the base station; however, control is not executed so as to reduce the above-described interference signal power from adjacent cells. That is, a base station can control received signal power from mobile terminals within a subordinate cell, but cannot control interference signal power from adjacent cells.

Prior art for control of interference from adjacent base stations exists (see for example JP 2003-259414 A). This technology of the prior art has as an object the alleviation of interference received by mobile terminals, that is due to the downlink signals from other base stations in a communication system in which uplink and downlink communications use the same frequency band. That is, a mobile terminal monitors the strength and frequency of interference signals due to downlink signals transmitted from another base station, and when the interference level exceeds a threshold, notifies the communicating base station of the presence of interference, and gives further notification of information on the time of occurrence of the interference. Upon receiving this notification, the base station changes the subband (subchannel) being used in data transmission to the mobile terminal to eliminate the problem of interference received by the mobile terminal. However, when there are no empty bands, the problem cannot be resolved by the base station, and so the higher-level device relative to the base station is notified of the interference information (interference occurrence, time of interference occurrence). The higher-level device investigates base stations adjacent to the base station of interest, specifies an adjacent base station which is the origin of the occurrence of interference based on the time of interference occurrence, and causes the adjacent base station which is the origin of the interference to change the subband being used for data transmission. Upon receiving the instruction from the higher-level device, the adjacent base station changes the subband being used for downlink data transmission. If there are no empty subbands, transmission is interrupted.

However, this technology of the prior art does not reduce interference imparted to the base station of a cell of interest due to uplink signals from mobile terminals in cells adjacent to the cell of interest, and in particular from mobile terminals existing in proximity to the edge of the adjacent cells.

SUMMARY OF THE INVENTION

In light of the above, an object of the invention is to reduce interference power from adjacent cells.

A further object of the invention is, when the total interference power received from mobile terminals in adjacent cells is greater than a preset value, to issue requests to the adjacent base stations to reduce interference, in order to reduce the interference powers.

A further object of the invention is to discriminate mobile terminals which exist at a cell border and generate strong interference signals, and, by reducing interference signals from the mobile terminals, to reduce the interference powers.

A further object of the invention is to improve the overall throughput of the system, by executing control to reduce interference signals imparted to base stations of adjacent cells by mobile terminals communicating with each base station.

The above problems are resolved by an interference reduction method in a base station which performs communication with mobile terminals existing in a subordinate cell, while also executing control to reduce interference from mobile terminals existing within adjacent cells.

A first interference reduction method has a step of measuring a total interference power received from mobile terminals in all adjacent cells, and a step of issuing requests to base stations of all the adjacent cells to reduce interference if the total interference power is greater than a preset value. The total interference power measurement step has a step of measuring a total received power for the base station and measuring a power received from all subordinate mobile terminals, as a desired power, and a step of subtracting the desired power from the total received power to calculate the total interference power.

A second interference reduction method has a step of measuring, for each adjacent cell, an interference power received from all mobile terminals within the adjacent cell, a step of totaling the interference power for each of the adjacent cells and determining a total interference power received from mobile terminals in all adjacent cells, and a step of issuing a request to reduce interference to the base stations in a prescribed number of adjacent cells for which the interference power is great, or to the base stations of adjacent cells for which the interference power is greater than a preset value, if the total interference power is greater than a preset value.

The above first and second interference reduction methods further comprise a step, when an interference reduction request is received, of discriminating mobile terminals which impart interference to the base station which is a source of the interference reduction request, and a step of temporarily lowering an uplink data transmission rate, or of temporarily halting uplink data transmission, for these mobile terminals.

Further, the above problems are resolved by a base station which performs communication with mobile terminals existing within a subordinate cell, while also executing control to reduce interference from mobile terminals existing within adjacent cells.

A first base station comprises an interference power measurement portion, which measures a total inference power received from mobile terminals in all adjacent cells, a comparison portion which compares the total interference power with a preset value, and an interference reduction request portion which issues requests to the base stations of all the adjacent cells to reduce interference if the total interference power is greater than the preset value. The interference power measurement portion comprises a total received power measurement portion, which measures a total power received by the base station, a desired power measurement portion, which measures a power received from all subordinate mobile terminals as a desired power, and an interference power calculation portion, which subtracts the desired power from the total received power to calculate the total interference power.

A second base station comprises an interference power measurement portion, which measures, for each adjacent cell, an interference power received from all the mobile terminals within the adjacent cell, a total interference power calculation portion, which calculates a total interference power received from the mobile terminals of all adjacent cells, and an interference reduction request portion, which issues requests to reduce interference to the base stations in a prescribed number of adjacent cells for which the interference power is great, or which issues a request to reduce interference to the base station of adjacent cells for which the interference power is greater than a preset value, if said total interference power is greater than another preset value.

The first and second base stations comprise an interference mobile terminal discrimination portion, which discriminates mobile terminals which impart interference to a base station which has sent the interference reduction request, and a scheduling portion, which temporarily lowers an uplink data transmission rate, or temporarily halts uplink data transmission, for these mobile terminals.

DESCRIPTION OF THE PREFERRED EMBODIMENTS

(A) First Embodiment (a) Network Configuration

Figure 1:
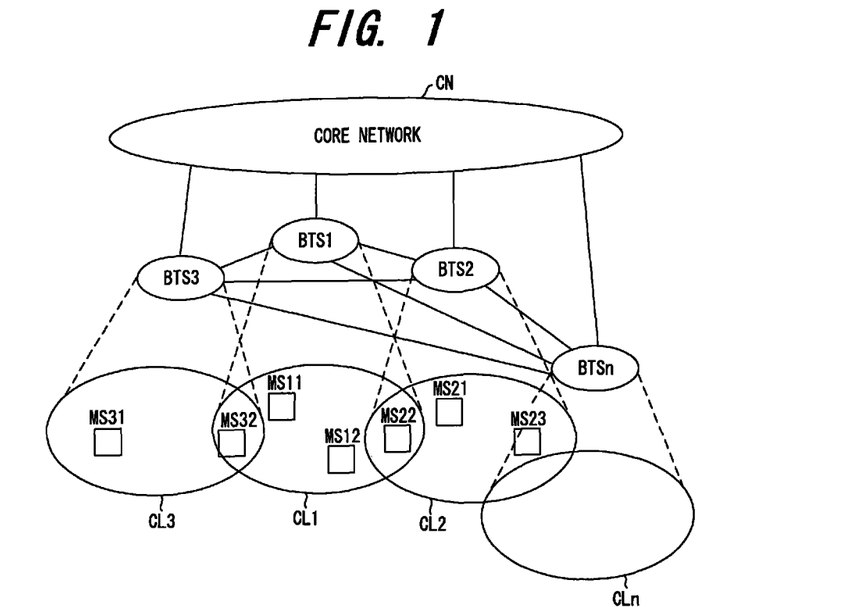
FIG. 1 shows a network configuration to which the invention can be applied.

FIG. 1 shows a network configuration to which the invention can be applied; numerous base stations BTS1 to BTSn are connected to a core network CN, and the base stations can communication with mobile terminals MSij within cells CL1 to CLn. The core network CN comprises the functions of both the core network shown in FIG. 14, and a radio network controller. The base stations are connected by wire (or, for example, wirelessly using the microwave band) with adjacent base stations, and comprise interfaces for mutual communication. The network configuration of FIG. 1 is for example a network as proposed by 3GPP TR 25.897 V0.3.0 (2003-08).

Figure 2:
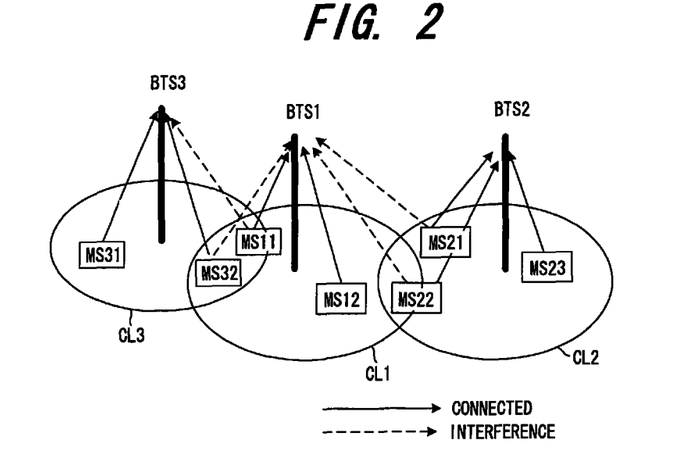
FIG. 2 is a conceptual diagram in which, in three cells, mobile terminals in adjacent cells impart interference to the base station of a cell of interest.

FIG. 2 shows a situation in which, in three cells CL1 to CL3, mobile terminals MS2j and MS3k in adjacent cells CL2 and CL3 impart interference to the base station BTS1 of the cell CL1 of interest. In FIG. 2, three cells are shown in order to facilitate the explanation. In these three cells, the same frequency band is used for uplink communication.

Focusing on base station BTS1 of cell CL1, mobile terminals MS21, MS22 in the adjacent cell CL2 are communicating with base station BTS2, but the uplink signals sent from the mobile terminals MS21, MS22 also arrive at base station BTS1 of the cell of interest CL1, to become interference signals. In this case, a mobile terminal MS23 not existing at a cell edge and a mobile terminal existing at a cell edge on the opposite side from the base station BST1 of interest either impart no interference, or impart only weak interference to the base station BTS1. Similarly, the mobile terminal MS32 in adjacent cell CL3 is communicating with base station BTS3, but uplink signals sent from mobile terminal MS32 also arrive at base station BTS1 of the cell CL1 of interest, and become interference signals.

(b) Received Signal Power

Figure 3:
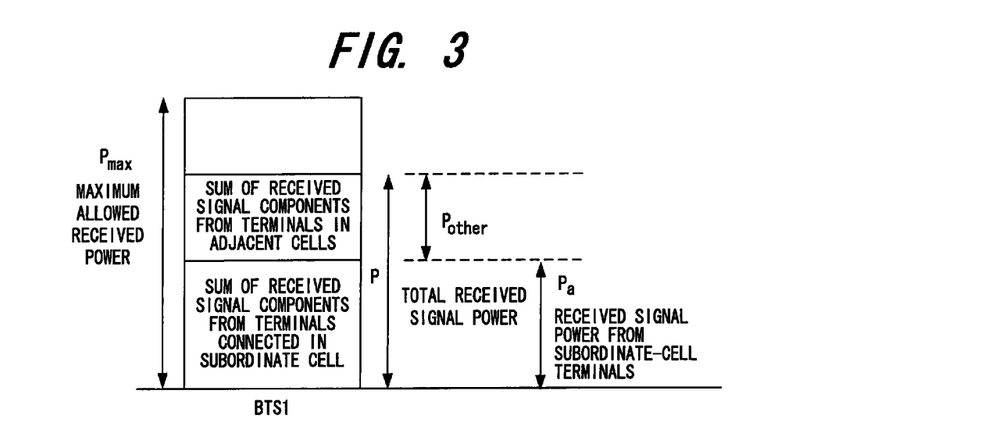
FIG. 3 explains the breakdown of received signal power.

As shown in FIG. 3, the total received signal power P received by the base station BTS1 is the sum of the received signal power $P_a$ from mobile terminals within the base station's own cell CL1, and the total adjacent received signal power $P_{other}$ received from mobile terminals within adjacent cells CL2, CL3 ($P=P_a+P_{other}$) (here, thermal noise is ignored). A higher-level device in the core network CN performs call admission control wherein monitoring is performed to determine whether the difference between the maximum allowed received signal power $P_{max}$ and the total received signal power P in base station BTS1 is equal to or less than a preset value, and if less than the preset value, a new call requested from a mobile terminal within the base station BTS1 is refused, but if equal to or greater than the preset value, the new call is accepted. Hence when the total adjacent received signal power $P_{other}$ becomes to large, reduction of this power $P_{other}$ is important for efficient use of radio resources.

(c) Processing at a Base Station Receiving Interference

Figure 4:
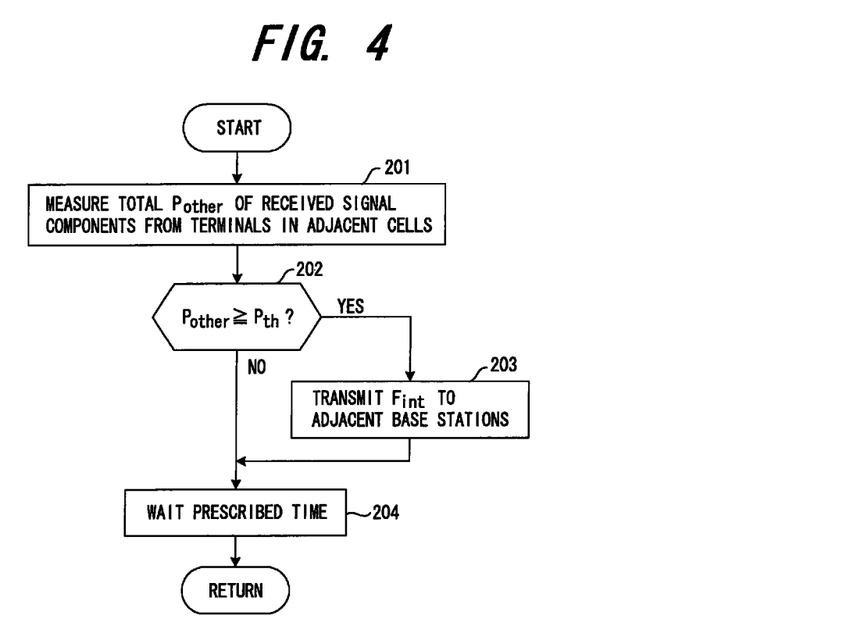
FIG. 4 shows the flow of processing in a base station receiving interference in a first embodiment.

FIG. 4 shows the flow of processing in a base station receiving interference in the first embodiment.

In the base station BTS1, the total adjacent received signal power $P_{other}$ from all adjacent cells is measured (step 201). The method of measurement of the interference power $P_{other}$ is calculated by measuring the total received signal power for the base station BTS1, as well as measuring the total received signal power from all mobile terminals within the subordinate cell as the desired power, and subtracting the desired power from the total received signal power for the base station BTS1.

Then, the total adjacent received signal power $P_{other}$ is compared with a threshold power $P_{th}$ (step 202), and if the total adjacent received signal power is equal to or greater than the threshold power ($P_{other} \geq P_{th}$), the base station BTS1 transmits a flag signal $F_{int}$ requesting interference reduction to all adjacent base stations (step 203). As described below, the adjacent base stations BTS2 and BTS3, upon receiving this flag signal $F_{int}$, execute control of the mobile terminals near the edge of the cell of the base station BTS1 of interest, among all subordinate mobile terminals, to either lower the data rate during uplink transmission or to forbid transmission for a fixed time. By this means, the total adjacent received signal power $P_{other}$ is reduced.

Then, processing waits for a prescribed time to elapse (step 204), and when the time has elapsed, the processing of step 201 and following steps is repeated. In step 202, if the total adjacent received signal power is smaller than the threshold power ($P_{other} < P_{th}$), interference is minimal, and so no action is taken, and processing waits for the prescribed time (step 204), after which the processing of step 201 and following steps is repeated.

Figure 5:
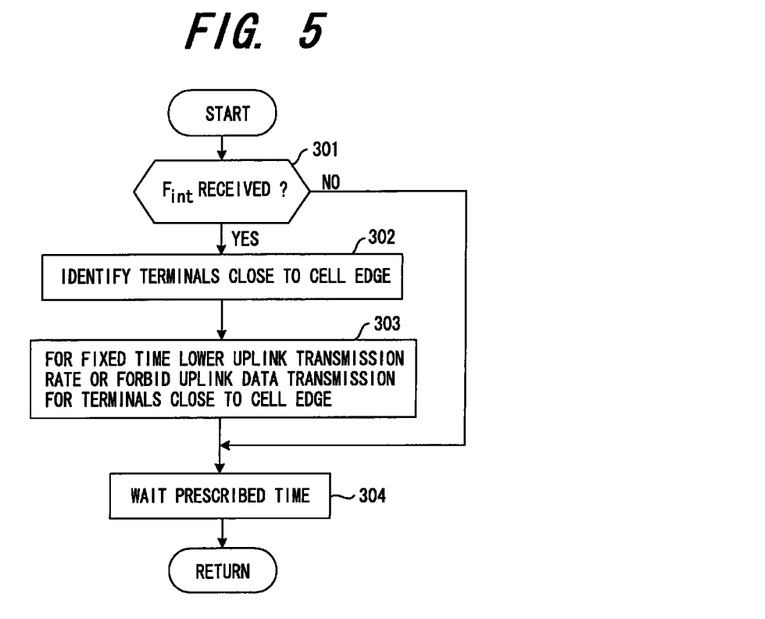
FIG. 5 shows the flow of processing in a base station accommodating mobile terminals which are imparting interference in the first embodiment.

(d) Processing by a Base Station Accommodating Mobile Terminals Imparting Interference FIG. 5 shows the flow of processing in a base station, for example base station BTS2, accommodating mobile terminals which are imparting interference, in the first embodiment.

The base station BTS2 monitors the reception of a flag signal $F_{int}$ (step 301), and if no flag signal $F_{int}$ is received, waits for a prescribed time to elapse (step 304), and after the time has elapsed, repeats the processing of step 301 and subsequent steps.

If on the other hand in step 301a flag signal $F_{int}$ has been received, mobile terminals which may be imparting interference to the base station BTS1 which has transmitted the flag signal $F_{int}$ are discriminated (step 302). That is, mobile terminals existing in proximity to the cell edge on the side of the base station which transmitted the flag signal $F_{int}$ are identified.

When discrimination of the mobile terminals imparting interference to the base station BTS1 is completed, the adjacent base station BTS2 employs a scheduling function to execute control to temporarily lower the transmission rate for uplink data, or to temporarily halt uplink data transmission, for these mobile terminals (step 303). Then, processing waits for the prescribed time to elapse (step 304), and after the time has elapsed, the processing of step 301 and subsequent steps is repeated.

The uplink data transmission limitation ends when a flag signal $F_{int}$ is no longer received, or when a mobile terminal no longer exists at the cell edge. A method can also be used in which the transmission limitation ends after a prescribed time has elapsed from the initiation of this transmission limitation.

As described above, if a flag signal $F_{int}$ requesting interference reduction is received, the uplink data transmission rates of mobile terminals which may be imparting interference are temporarily lowered, or uplink data transmission is temporarily halted, so that interference at the base station BTS1 can be reduced.

(e) Discrimination of Mobile Terminals at a Cell Edge

Figure 6:
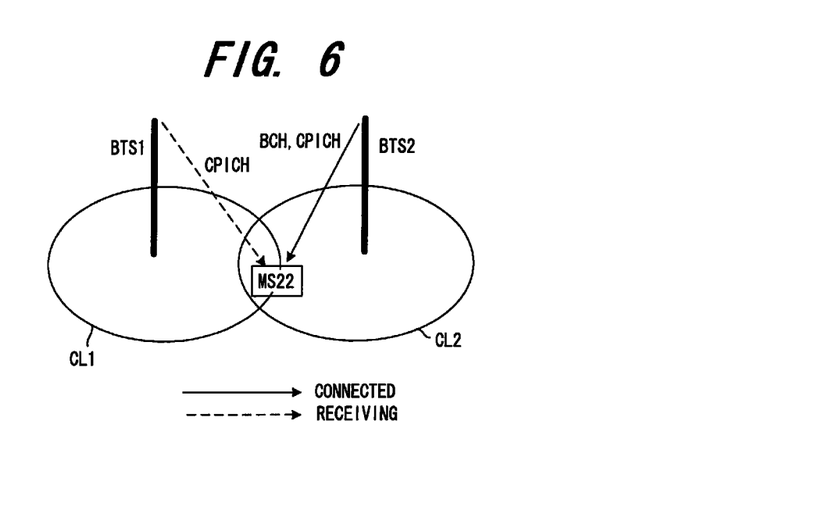
FIG. 6 explains a method of discrimination of mobile terminals which may be imparting interference.

FIG. 6 explains a method of discrimination of mobile terminals which are imparting interference.

As shown in FIG. 6, when a mobile terminal MS22 which is communicating with base station BTS2 exists within the border region of the cells CL1, CL2 of base stations BTS1, BTS2 or in proximity to the border, downlink signals are received from both base stations. A common pilot signal (CPICH signal) is comprised by each downlink signal. The mobile terminal MS22 measures the received powers P1, P2 of the common pilot signals from the respective base stations BTS1, BTS2, and if the absolute value of the difference ΔP in the two received powers is equal to or less than a preset value, then the mobile terminal is judged to exist in proximity to the cell edge and may be imparting interference to the base station BTS1 which is the source of transmission of the flag signal $F_{int}$, whereas if the value is greater than the preset value, the mobile terminal is judged not to be imparting interference to the base station BTS1 which is the source of transmission of the flag signal $F_{int}$.

Figure 7:
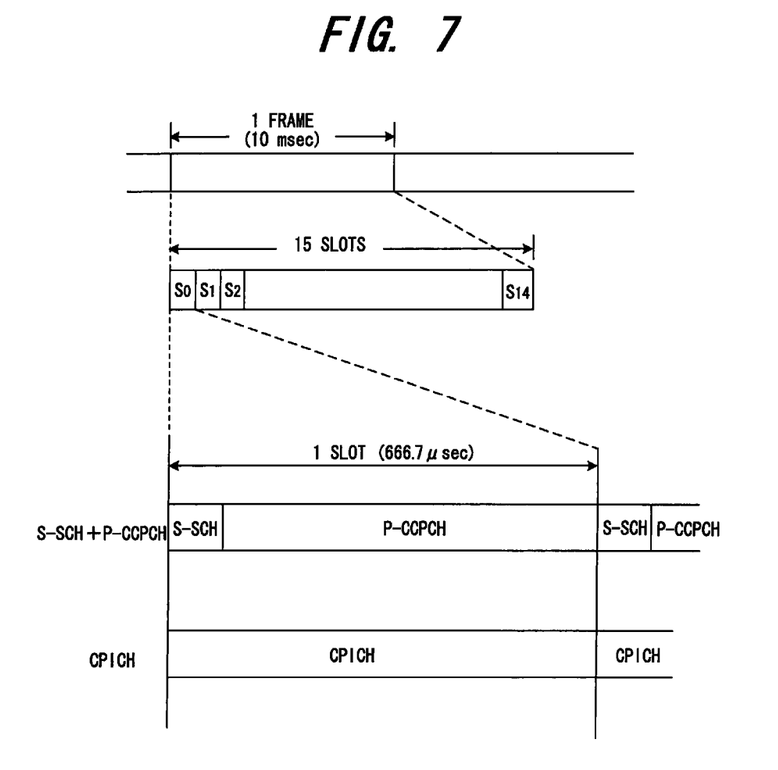
FIG. 7 explains an example of a common pilot signal in a W-CDMA system.

FIG. 7 explains an example of a common pilot signal transmitted from each base station in a W-CDMA system; one frame comprises 15 slots S0 to S14 in 10 msec. However, this invention does not depend on the physical downlink channel configuration.

One primary common control physical channel P-CCPCH and one common pilot channel CPICH exist in each cell in the downlink-direction common channel. the primary common control channel P-CCPCH is used to transmit BCH (broadcast channel) information; this BCH information comprises necessary information relating to the base station which transmits this P-CPICH, base station codes which are scramble codes of adjacent base stations, and similar. On the other hand, the common pilot channel CPICH transmits the common pilot signal; the common pilot signal is spread using a base station code (scramble code) of the base station which transmits this CPICH and a CPICH channelization code, and is transmitted. On the receiving side, the common pilot signal is used to perform channel estimation, received power measurements, and other control processing. In FIG. 7, S-SCH is a secondary synchronization channel.

The mobile terminal MS22 (see FIG. 6) uses the base station code for the base station BTS2 with which it is communicating and the CPICH channelization code to separate the common pilot signal transmitted from the communicating base station BTS2, and measures the received power P2 of the common pilot signal. From the BCH information transmitted via the primary common control channel P-CCPCH, the base station code of the adjacent base station BTS1 is acquired, and using this base station code and the CPICH channelization code, the common pilot signal transmitted from the adjacent base station BTS1 is separated, and the received power P1 of this common pilot signal is measured.

Figure 8:
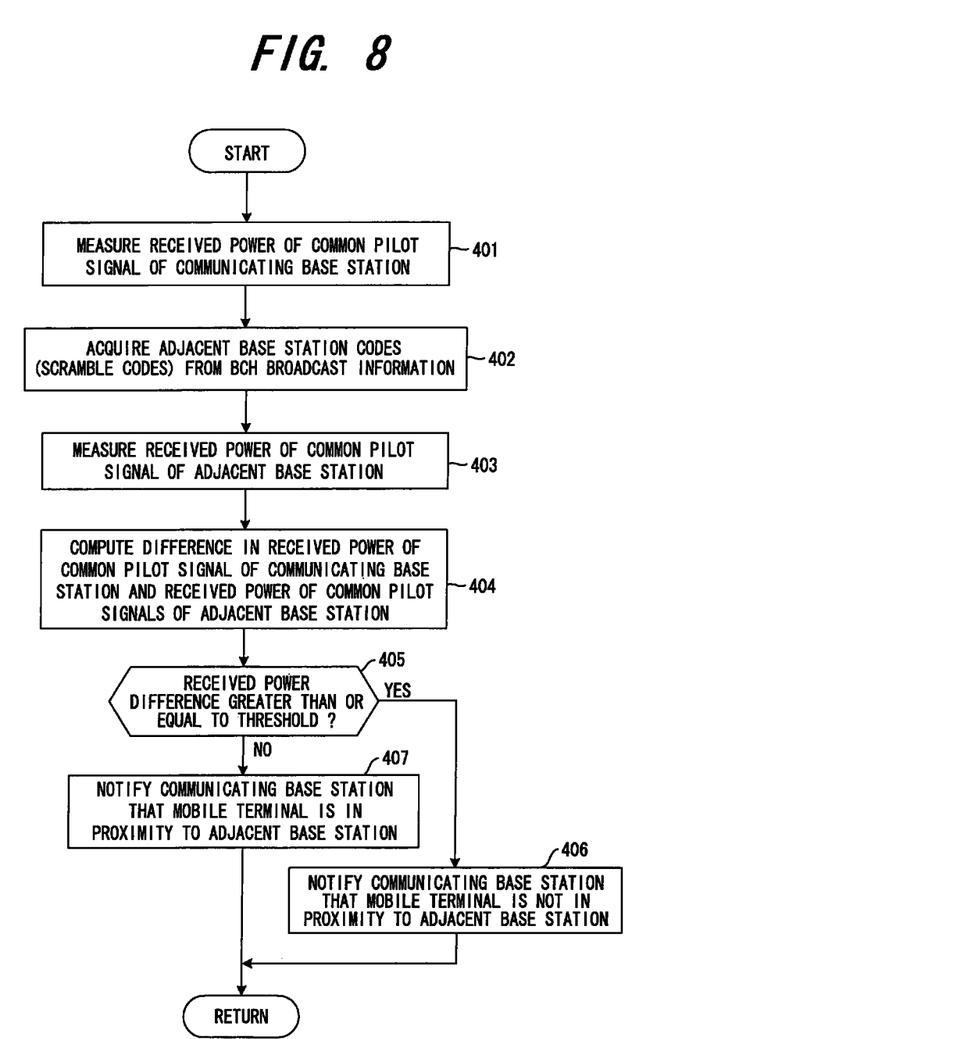
FIG. 8 shows the flow of processing to discriminate mobile terminals which may be imparting interference.

FIG. 8 shows the flow of processing to discriminate mobile terminals which may be imparting interference.

Each mobile terminal communicating with base station BTS2, such as for example mobile terminal MS22, measures the received power of the common pilot signal transmitted by the communicating base station BTS2 via the common pilot channel CPICH (step 401). Then, the base station code (scramble code) for the adjacent base station BTS1 is acquired from BCH information transmitted via P-CCPCH (step 402), and this base station code and the CPICH channelization code are used to separate the common pilot signal transmitted from the adjacent base station BTS1, and the received power P1 of this common pilot signal is measured (step 403).

When measurement of the received powers P1, P2 is completed, the mobile terminal computes the absolute value of the difference ΔP of the received powers P2, P1 of the common pilot signals from the communicating base station BTS2 and from the adjacent base station BTS1 (ΔP=|P2−P1|, step 404), and judges whether this difference ΔP is greater than or equal to a threshold (step 405). If the difference ΔP is greater than or equal to the threshold, the mobile terminal judges that it is not in the proximity of the adjacent base station BTS1, and the communicating base station BTS2 is notified of the judgment result, with the base station name of the adjacent base station attached (step 406). Here, the communicating base station BTS2 is notified of the judgment result; however, in this case notification of this judgment result need not necessarily be given, and notification may be omitted.

On the other hand, if the difference ΔP is less than the threshold, then the mobile terminal judges that it is in proximity to the cell edge, and the communicating base station BTS2 is notified of this judgment result, with the base station name of the adjacent base station attached (step 407). Or, a flag signal indicating the possibility that interference is being imparted is transmitted.

Based on the judgment results received from each of the mobile terminals, the base station BTS2 identifies mobile terminals which are imparting interference to the base station BTS1 which is the source of transmission of the flag signal $F_{int}$, and the scheduling function is used to temporarily lower the transmission rate of uplink data, or to temporarily halt the transmission of uplink data, for these mobile terminals.

(f) Configuration of a Base Station

Figure 9:
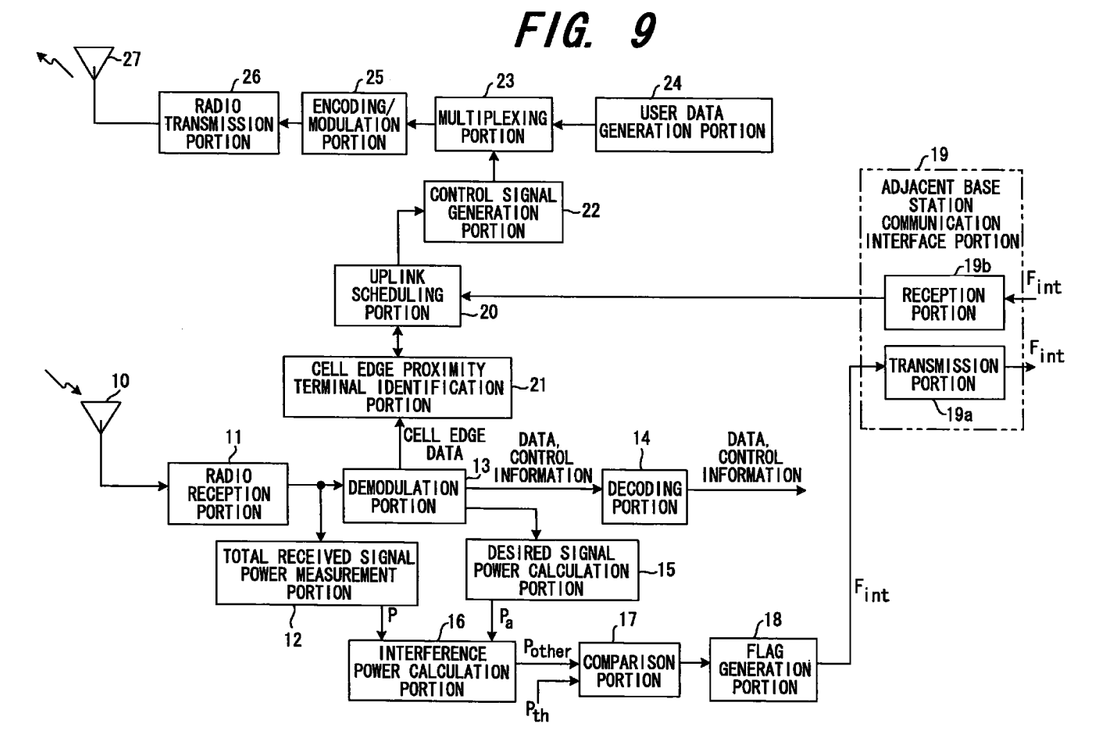
FIG. 9 shows the configuration of a base station in the first embodiment.

FIG. 9 shows the configuration of a base station in the first embodiment.

The radio reception portion 11 amplifies radio signals received by the antenna 10 and down-converts the frequency from a high-frequency band to a baseband. The total received signal power measurement portion 12 measures the total received signal power P using signals output from the radio reception portion 11, and the demodulation portion 13 performs despreading after orthogonal demodulation using scramble codes unique to each terminal, and further performs despreading using a prescribed channelization code, to separate the received signals into (1) user data and control signals, (2) signals used to measure the total received signal power from subordinate mobile terminals, and (3) cell edge notification signals sent from mobile terminals. The total received signal power from all the communicating mobile terminals is hereafter called the desired signal power (or desired power) The cell edge notification signal shows whether the mobile terminal is in proximity to the cell edge or not.

Signals used to measure the desired power are obtained from despreading of received signals using despreading codes unique to mobile terminals. The decoding portion 14 performs decoding processing of the demodulated data and control signals, performs error detection and correction processing, and outputs the data and control information obtained as a result.

The desired signal power calculation portion 15 uses the signals obtained by despreading to measure the desired signal power $P_a$, and the interference power calculation portion 16 uses the equation $$P_{other} = P - P_a \qquad (1)$$

to calculate the received signal power $P_{other}$ received from mobile terminals in all adjacent cells as the interference power. The received signal power $P_{other}$ is hereafter called the total adjacent received signal power. The comparison portion 17 compares the total adjacent received signal power $P_{other}$ with the threshold power $P_{th}$, and inputs the comparison result to the flag generation portion 18. The flag generation portion 18 makes reference to the comparison result, and if the total adjacent received signal power is greater than or equal to the threshold power ($P_{other} \geq P_{th}$), generates a flag signal $F_{int}$ requesting interference reduction by adjacent base stations and inputs the flag signal $F_{int}$ to the adjacent base station communication interface portion 19. The transmission portion 19a of the adjacent base station communication interface portion 19 attaches a transmission source base station ID to this flag signal $F_{int}$, and transmits the flag signal to all adjacent base stations. If the total adjacent received signal power is less than the threshold power, no flag signal is generated.

On the other hand, upon receiving a flag signal $F_{int}$ from an adjacent base station, the reception portion 19b of the adjacent base station communication interface 19 notifies the uplink scheduling portion 20 of the reception of the flag signal $F_{int}$ and of the base station name of the transmission source of the flag signal $F_{int}$. The uplink scheduling portion 20, upon receiving the notification of flag signal reception, inputs the base station name of the transmission source of the flag signal $F_{int}$ to the cell edge proximity terminal identification portion 21.

Since the cell edge proximity terminal identification portion 21 receives the cell edge notification signal (cell edge data) which is sent from each of the mobile terminals in accordance with the processing of FIG. 8, it judges based on this cell edge notification signal whether each of the communicating mobile terminals exists at a cell edge, that is, whether each communicating mobile terminal is imparting interference to the base station which sent the flag signal $F_{int}$, and notifies the uplink scheduling portion 20 of the mobile terminals which are imparting interference.

Upon receiving this notification, the uplink scheduling portion 20 issues instructions to the control signal generation portion 22 to limit uplink data transmission of mobile terminals which are imparting interference. The control signal generation portion 22 generates control signals to limit the uplink data transmission of specified mobile terminals. That is, control signals to temporarily lower the uplink data transmission rate, or control signals to temporarily halt uplink data transmission, are created. The multiplexing portion 23 multiplexes the control signals with user data generated by the user data generation portion 24, and the encoding/modulation portion 25 encodes the multiplexed data, performs spreading using a prescribed spreading code, and performs orthogonal modulation of the spreading result; and the radio transmission portion 26 converts the modulated signals to a high frequency, performs high-frequency amplification and similar, and transmits the transmission signals from the antenna 27.

A mobile terminal which receives a signal transmitted from the antenna 27 and is subjected to an uplink data transmission limitation, temporarily lowers the uplink data transmission rate, or temporarily halts uplink data transmission. If a flag signal $F_{int}$ is no longer received, or if a fixed time has elapsed since the transmission rate was lowered or transmission was temporarily halted, the uplink scheduling portion 20 executes control to cancel the limitation on uplink transmission data of the mobile terminal.

By means of the first embodiment, interference power from adjacent cells can be reduced. Moreover, by means of the first embodiment, when the total interference power received from mobile terminals in adjacent cells is greater than a preset value, a request is issued to adjacent base stations to reduce interference, so that the interference power can be reduced, and throughput for the overall system can be improved. Further, by means of the first embodiment, mobile terminals existing at cell borders and which are generating large interference signals can be discriminated, and by reducing interference signals from such mobile terminals, the interference power can be reduced.

(B) Second Embodiment

Figure 10:
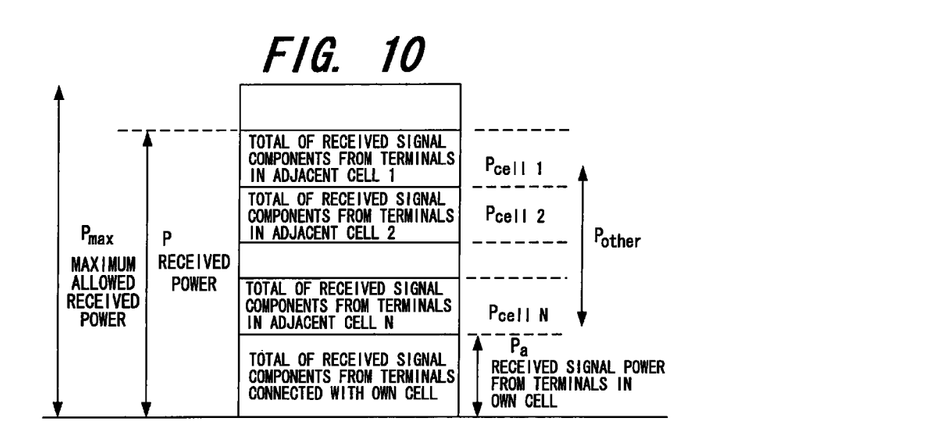
FIG. 10 explains a second embodiment.

In the first embodiment, the total received signal power from mobile terminals in all adjacent cells (the total adjacent received signal power) $P_{other}$ was measured based on equation (1). In a second embodiment, as shown in FIG. 10, the total received signal powers from mobile terminals in a cell (adjacent received signal power) $P_{cell\ 1}$ to $P_{cell\ N}$ is measured for each cell among all adjacent cells cell 1 to cell N, and the equation below is used, that is, the adjacent received signal powers $P_{cell\ 1}$ to $P_{cell\ N}$ for all adjacent cells are totaled to calculate the total adjacent received signal power $P_{other}$.

$$Pother = \sum_{n=1}^{N} Pcelln \qquad (2)$$

(Here it is assumed that each mobile terminal performs scrambling using a scramble code unique to the cell before transmitting uplink data.) The adjacent received signal powers $P_{cell\ 1}$ to $P_{cell\ N}$ for the adjacent cells cell 1 to cell N are measured by despreading received signals using the scramble code for each adjacent cell, and then separating the common pilot signal for each base station.

Figure 11:
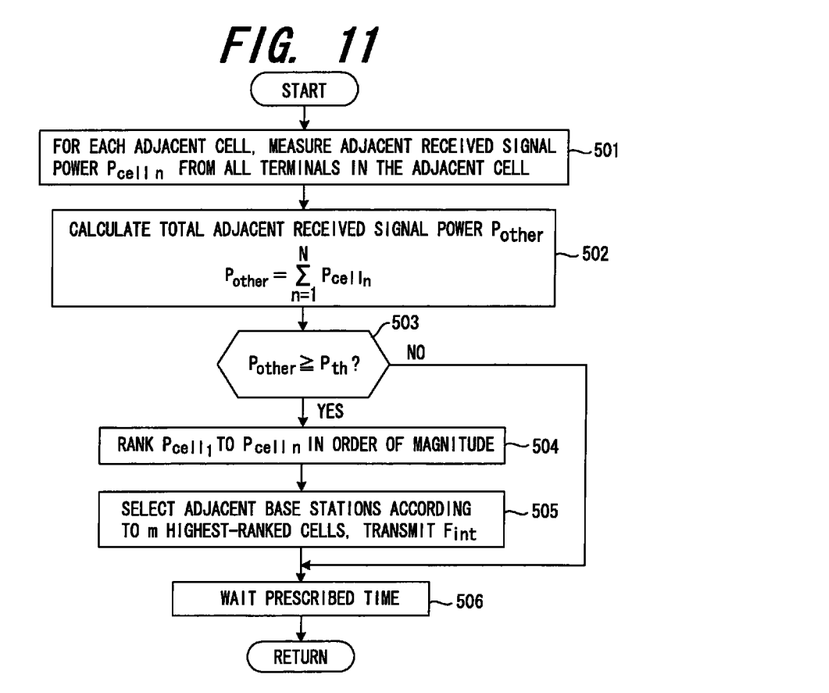
FIG. 11 shows the flow of processing in a base station receiving interference in the second embodiment.

FIG. 11 shows the flow of processing of a base station receiving interference in the second embodiment.

The adjacent received signal powers $P_{cell\ 1}$ to $P_{cell\ N}$ from mobile terminals within a cell are measured for all adjacent cells cell 1 to cell N (step 501), and equation (2) is used to calculate the total adjacent received signal power $P_{other}$ (step 502). Then, the total adjacent received signal power $P_{other}$ and a threshold power $P_{th}$ are compared (step 503), and if the total adjacent received signal power is equal to or greater than the threshold power ($P_{other} \geq P_{th}$), then the adjacent received signal powers $P_{cell\ 1}$ to $P_{cell\ N}$ are ranked in order of magnitude (step 504). Then, a flag signal $F_{int}$ requesting interference reduction is transmitted to the base stations of the m highest-ranked cells, such as for example the two highest-ranked cells (step 505). Upon receiving this flag signal $F_{int}$, an adjacent base station executes control, similarly to the first embodiment (see the processing flow of FIG. 5), to lower the data rate during uplink transmission, or to prohibit transmission, by mobile terminals close to the cell edge on the side of the base station BST1 of interest for a fixed period of time. By this means, the total adjacent received signal power $P_{other}$ is reduced.

Thereafter, processing waits for a prescribed time to elapse (step 506), and when the time has elapsed processing returns to step 501 and subsequent steps. In step 503, if the total adjacent received signal power is less than the threshold power ($P_{other} < P_{th}$), then processing waits for a prescribed time (step 506), and when the time has elapsed, the processing of step 501 and subsequent steps is repeated.

Figure 12:
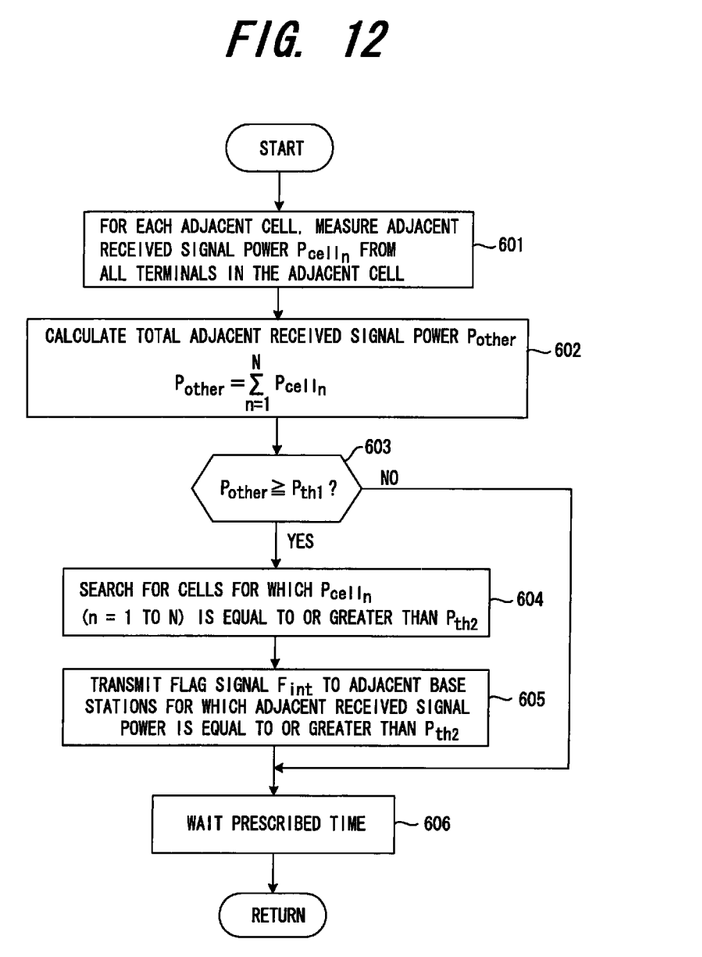
FIG. 12 shows another flow of processing in a base station receiving interference in the second embodiment.

FIG. 12 shows another flow of processing in a base station receiving interference in the second embodiment.

For each cell of all the adjacent cells cell 1 to cell N, the adjacent received signal powers $P_{cell\ 1}$ to $P_{cell\ N}$ from mobile terminals within the cell are measured (step 601), and equation (2) is used to calculate the total adjacent received signal power $P_{other}$ (step 602). Then, the total adjacent received signal power $P_{other}$ is compared with a threshold power $P_{th1}$ (step 603), and if the total adjacent received signal power is equal to or greater than the threshold power ($P_{other} \geq P_{th1}$), then the adjacent received signal powers $P_{cell\ 1}$ to $P_{cell\ N}$ are searched for powers equal to or greater than a threshold $P_{th2}$ (step 604), and a flag signal $F_{int}$ requesting interference reduction is sent to the base stations of the adjacent cells for which adjacent received signal powers are equal to or greater than the threshold $P_{th2}$ (step 605). Upon receiving this flag signal $F_{int}$, similarly to the first embodiment (see the processing flow of FIG. 5), an adjacent base station executes control to lower the data rate during uplink transmission, or control to prohibit uplink transmission, for a fixed time by mobile terminals which are close to the cell edge on the side of the base station DTS of interest. By this means, the total adjacent received signal power $P_{other}$ is reduced.

Then, processing waits for a prescribed time to elapse (step 606), and when the time has elapsed, the processing of step 601 and subsequent steps is repeated. In step 603, if the total adjacent received signal power is smaller than the threshold power ($P_{other} < P_{th1}$), processing waits for a prescribed time to elapse (step 606), and when the time has elapsed, the processing of step 601 and subsequent steps is repeated.

Figure 13:
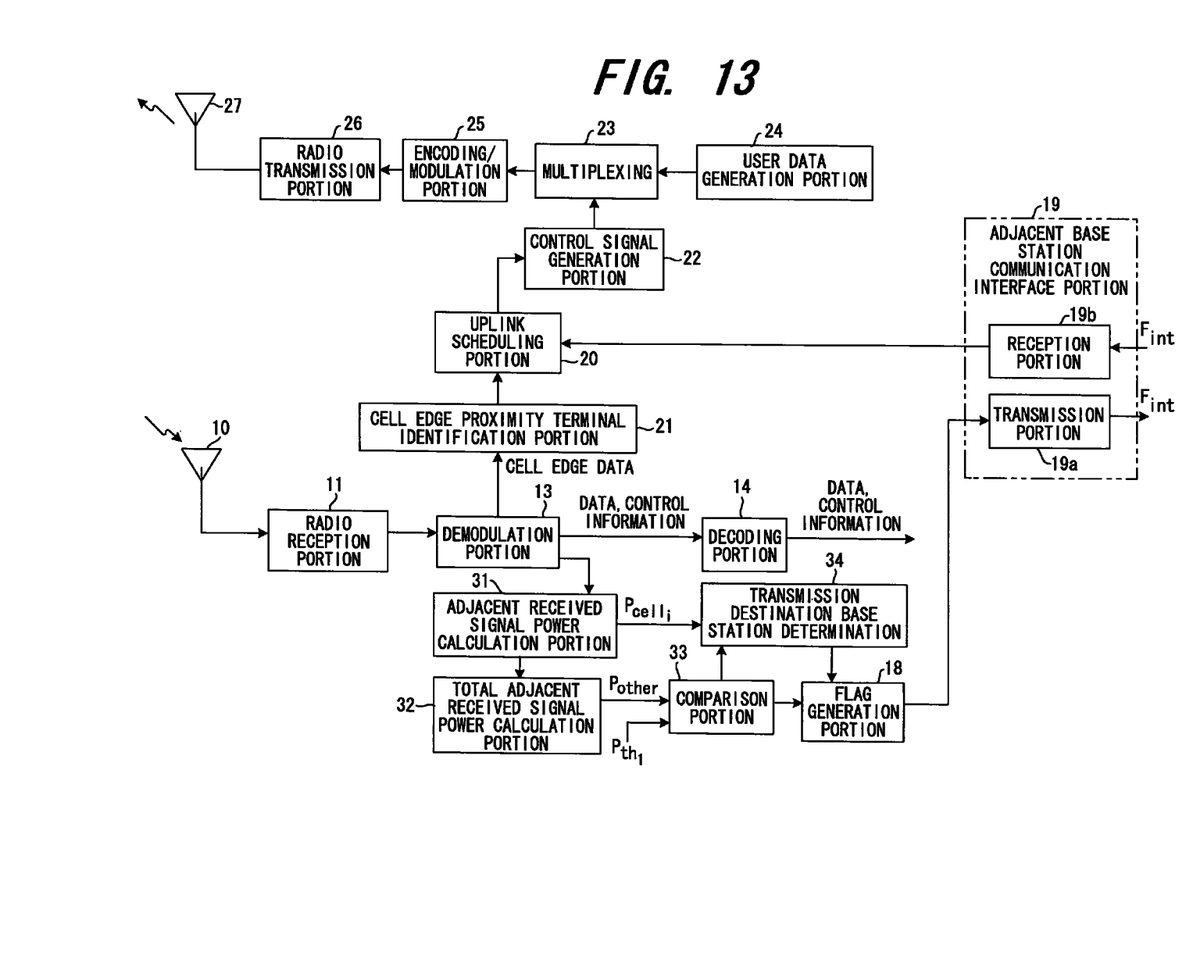
FIG. 13 shows the configuration of a base station in the second embodiment.

FIG. 13 shows the configuration of a base station in the second embodiment; differences with that of the first embodiment shown in FIG. 9 are the fact that the total adjacent received signal power $P_{other}$ is calculated, and the fact that the destination base stations for transmission of flag signals $F_{int}$ are determined.

The demodulation portion 13 uses a scramble code specific to each cell to perform despreading of the baseband signal after orthogonal demodulation, and after obtaining despread signals, further uses a prescribed channelization code to perform despreading, and separates the received signal into (1) user data and control signals, and (2) cell edge notification signals (cell edge data) sent from mobile terminals and similar.

The adjacent received signal power calculation portion 31 is supplied despread signals obtained by despreading and calculates adjacent received signal powers $P_{cell\ N}$ (n=1 to N), and the total adjacent received signal power calculation portion 32 uses equation (2) to calculate the total received signal power $P_{other}$. The comparison portion 33 compares the total adjacent received signal power $P_{other}$ with a threshold power $P_{th1}$, and inputs the comparison result to the flag generation portion 18 and to the transmission destination base station determination portion 34 which determines flag transmission destination base stations. If the total adjacent received signal power is equal to or greater than a threshold value ($P_{other} \geq P_{th1}$), the transmission destination base station determination portion 34 determines destination base stations for transmission of flag signals, and inputs these to the flag generation portion 18. The destination base stations for transmission of flag signals are the base stations of the m highest-ranked cells in a rank in order of magnitude of the adjacent received signal powers $P_{cell\ 1}$ to $P_{cell\ N}$. Or, the destination base stations for flag signal transmission may be the base stations of those cells for which the adjacent received signal power $P_{cell\ 1}$ to $P_{cell\ N}$ is equal to or greater than a threshold $P_{th2}$.

If the total adjacent received signal power is equal to or greater than the threshold power ($P_{other} \geq P_{th1}$), the flag generation portion 18 generates a flag signal $F_{int}$ requesting interference reduction, attaches the transmission source base station name and the transmission destination base station names to this flag signal $F_{int}$, and inputs the result to the adjacent base station communication interface portion 19, and the transmission portion 19a transmits the flag signal $F_{int}$ to the transmission destination base stations.

On the other hand, upon receiving a flag signal $F_{int}$ from an adjacent base station, the reception portion 19b of the adjacent base station communication interface portion 19 notifies the uplink scheduling portion 20 of the fact that a flag signal $F_{int}$ has been received and of the base station name of the base station which is the transmission source of the flag signal $F_{int}$. The uplink scheduling portion 20, upon receiving this flag signal reception notification, inputs the transmission source base station name for the flag signal $F_{int}$ to the cell edge proximity terminal identification portion 21.

Since the cell edge proximity terminal identification portion 21 receives the cell edge notification signal (cell edge data) which is sent from each of the communicating mobile terminals in accordance with the processing of FIG. 8, based on this the cell edge cell edge notification signal it judges whether each communicating mobile terminal exists at a cell edge, or in other words, identifies those communicating mobile terminals which are imparting interference to the base station which has sent the flag signal $F_{int}$, and notifies the uplink scheduling portion 20 of the identified mobile terminals which are imparting interference.

Upon receiving this notification, the uplink scheduling portion 20 instructs the control signal generation portion 22 to limit uplink data transmission of mobile terminals which are imparting interference. Based on this instruction, the control signal generation portion 22 creates control signals to temporarily lower the uplink data transmission rate, or to temporarily halt uplink data transmission, and transmits this control signal to the mobile terminals of the instruction. The multiplexing portion 23 multiplexes the control signal with user data generated by the user data generation portion 24, and after passing through the encoding/modulation portion 25 and radio transmission portion 26, the signals are transmitted from the antenna 27 to the mobile terminals.

A mobile terminal for which uplink data transmission has been limited temporarily lowers the uplink data transmission rate, or temporarily halts uplink data transmission. If no flag signal $F_{int}$ is received, the uplink scheduling portion 20 executes control to cancel limitations on uplink data transmission of the mobile terminals.

By means of the second embodiment, advantageous results similar to those of the first embodiment can be obtained. Further, by means of the second embodiment, when the total adjacent received signal power (interference power) becomes large, interference power from adjacent cells from which significant interference is imparted is reduced, so that the throughput of the system as a whole can be improved.

What is claimed is:

1. An interference reduction method for a base station, comprising:
   measuring, at the base station, which communicates with mobile terminals in a subordinate cell and executes control to reduce interference from mobile terminals in adjacent cells, a total interference power received from the mobile terminals in all adjacent cells; and
   issuing from the base station a request to base stations of all the adjacent cells to reduce interference if the total interference power is greater than a preset value.

2. The interference reduction method for a base station according to claim 1, wherein said total interference power measurement comprises:
   measuring a total received power at the base station while measuring a received power from all subordinate mobile terminals as a desired power; and
   subtracting the desired power from the total received power to calculate said total interference power.

3. The interference reduction method for a base station according to claim 1, further comprising:
in a base station which has received said interference reduction request, discriminating mobile terminals which impart interference to the base station which is a source of the interference reduction request and;
lowering temporarily an uplink data transmission rate for these mobile terminals, or halting temporarily uplink data transmission.

4. The interference reduction method for a base station according to claim 3, wherein said interference mobile terminal discrimination includes:
measuring for each mobile terminal, the received power from a base station with which the mobile terminal communicates and the received power from the interference reduction request source base station and;
judging the mobile terminal imparts interference to the interference reduction request source base station if the difference in the two received powers is equal to or less than a preset value.

5. The interference reduction method for a base station according to claim 4, wherein
the received powers from said communicating base station and from said interference reduction request source base station are measured based on downlink common pilot signals from each of the base stations.

6. An interference reduction method for a base station comprising:
measuring, at the base station, which communicates with mobile terminals in a subordinate cell and executes control to reduce interference from mobile terminals in adjacent cells, for each adjacent cell, an interference power received from all mobile terminals within the adjacent cells;
totaling the interference powers for said adjacent cells to determine a total interference power received from mobile terminals in all adjacent cells; and
issuing from the base station a request to reduce interference to base stations in a prescribed number of adjacent cells for which the interference power is great, or to base stations of adjacent cells for which the interference power is greater than a preset value, if the total interference power is greater than a preset value.

7. A base station comprising:
an interference power measurement portion, which measures, at the base station, which communicates with mobile terminals in a subordinate cell and executes control to reduce interference from mobile terminals in adjacent cells, a total interference power received from the mobile terminals in all adjacent cells;
a comparison portion, which compares the total interference power with a preset value; and
an interference reduction request portion, which issues from the base station a request to reduce interference to base stations of all the adjacent cells if the total interference power is greater than the preset value.

8. The base station according to claim 7, wherein said interference power measurement portion comprises:
a total received power measurement portion, which measures a total received power at the base station;
a total desired power measurement portion, which measures, as a desired power, a power received from all subordinate mobile terminals; and
an interference power calculation portion, which subtracts the desired power from the total received power to calculate said total interference power.

9. The base station according to claim 7, further comprising a communication interface portion, which directly communicates with adjacent base stations.

10. The base station according to claim 7, further comprising:
an interference mobile terminal discrimination portion which discriminates mobile terminals which imparts interference to a base station which has sent said interference reduction request, and;
a scheduling portion which temporarily lowers an uplink data transmission rate or temporarily halts uplink data transmission, for the mobile terminals.

11. The base station according to claim 10, wherein
said interference mobile terminal discrimination portion investigates, for each mobile terminal, whether the difference between the received power from a base station with which the mobile terminal communicates and the received power from said interference reduction request source base station is equal to or less than a preset value, and if equal to or less than the preset value, judges that the mobile terminal imparts interference to said interference reduction request source base station.

12. A base station comprising:
an interference power measurement portion, which measures at the base station, for each adjacent cell, an interference power received from all mobile terminals within the adjacent cell, the base station communicates with mobile terminals in a subordinate cell and executes control to reduce interference from mobile terminals in adjacent cells;
a total interference power calculation portion, which calculates a total interference power received from mobile terminals in all adjacent cells; and
an interference reduction request portion, which issues from the base station a request to reduce interference to base stations in a prescribed number of adjacent cells for which the interference power is great, or to base stations of adjacent cells for which the interference power is greater than a preset value, if said total interference power is greater than another preset value.

* * * * *